March 22, 1960

R. K. SHEWMON 2,929,944

DYNAMOELECTRIC MACHINE

Filed July 24, 1956

INVENTOR.
RALPH K. SHEWMON
BY
D. C. Staley
HIS ATTORNEY

March 22, 1960 R. K. SHEWMON 2,929,944
DYNAMOELECTRIC MACHINE
Filed July 24, 1956 3 Sheets-Sheet 2
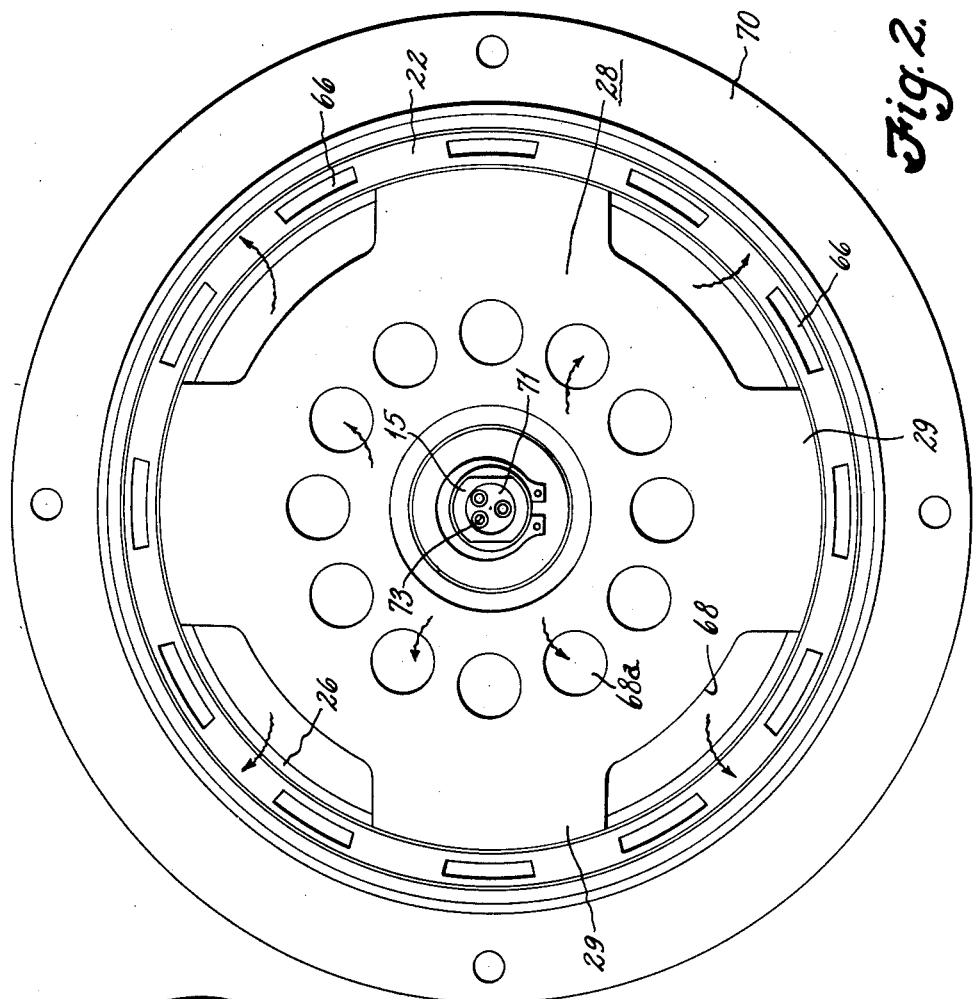
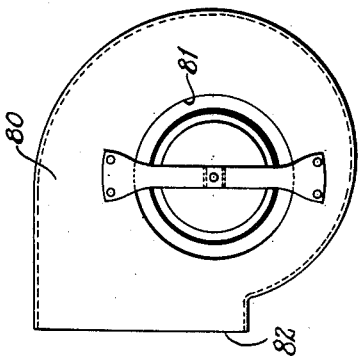
INVENTOR.
RALPH K. SHEWMON
BY
D. C. Staley
HIS ATTORNEY

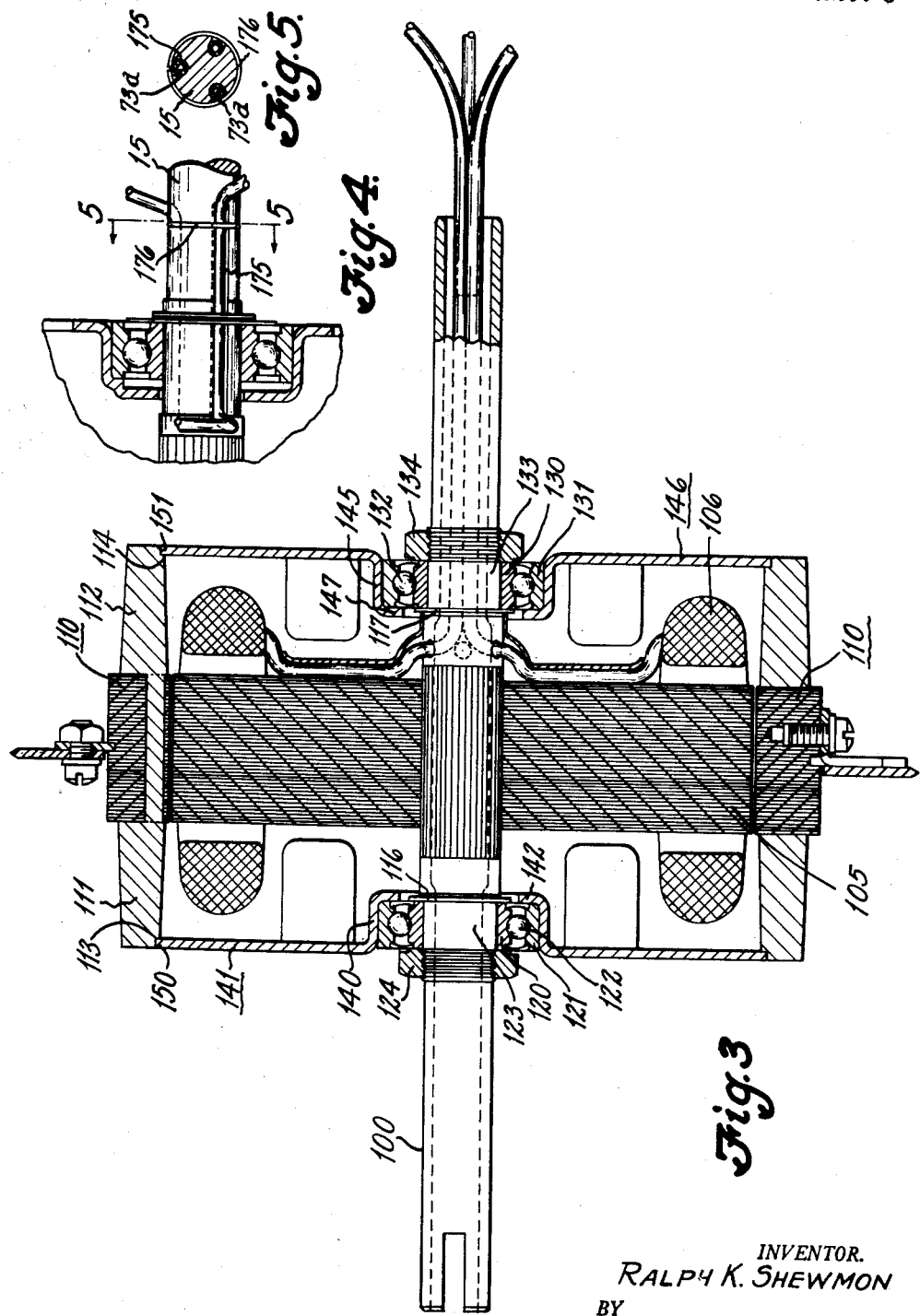

United States Patent Office 2,929,944
Patented Mar. 22, 1960

2,929,944

DYNAMOELECTRIC MACHINE

Ralph K. Shewmon, Centerville, Ohio, assignor to General Motors Corporation, Detroit, Mich., a corporation of Delaware Application July 24, 1956, Serial No. 599,708

3 Claims. (Cl. 310—67)

This invention relates to a dynamoelectric machine, and specifically to electric motors.

An object of the invention is to provide a dynamoelectric machine having a stator and a rotor in which one of the members is carried on a shaft and the other member is supported upon the shaft by means of support members that have resiliency sufficient to maintain concentric assembly of the members during relative rotation therebetween.

Another object of the invention is to provide a dynamoelectric machine having stator and rotor members wherein one of the members is fixedly secured to a shaft and the other member is supported upon the shaft by means of resilient support plates that have resilience in an axial direction, the resilience of the support plates providing spring mounting pressure to support the said other member and to pressure load the bearings on which the support plates are mounted.

Another object of the invention is to provide a dynamoelectric machine having stator and rotor members wherein one of the members is carreid on a shaft and the other member is supported by disk-like support plates that are carried on bearing members supported on the shaft, the disk-like support plates having peripheral portions that engage the outer of the rotor and stator members to support the same, the disk-like members also having resilience in an axial direction and assembled on the shaft with the bearing members in a manner that the spatial separation of the outer peripheries of opposing disk support members is less than the spatial separation between shoulders provided on the outer of the rotor and stator members whereby to effect a spring action engagement of the disk members on the member it supports for holding the electric motor assembly together. The spring action of the disk-like support members also effects a spring loading of the bearing members on the shaft.

It is another object of the invention to provide a dynamo-electric machine of the type referred to in the foregoing object positioned within a housing to effect a forced circulation of air through the housing by means of fan blades that are secured to the rotor member of the dynamo-electric machine, the fan blades constituting a wheel forming a forced air circulating member of the squirrel cage type adapted to rotate within a housing that is in the form of a volute to provide for a forced circulation through the fan housing, the disk-like support plates of the dynamo-electric machine having openings through which air is circulated from the body of air passing through the fan housing so that cooling air is passed internally of the dynamo-electric machine to remove heat from the stator windings of the machine.

Further objects and advantages of the present invention will be apparent from the following description, reference being had to the accompanying drawings wherein a preferred form of the invention is clearly shown.

In the drawings:

Figure 2 is an end view of the dynamo-electric machine.

Figure 3 is a cross sectional view illustrating a modified structural arrangement of the dynamo-electric machine.

Figure 4 is a cross sectional view of another modified structure of the apparatus.

Figure 5 is a cross sectional view taken along line 5—5 of Figure 4.

Figure 6 is an elevational view of a fan housing incorporating the dynamo-electric machine of this invention.

Figure 1:
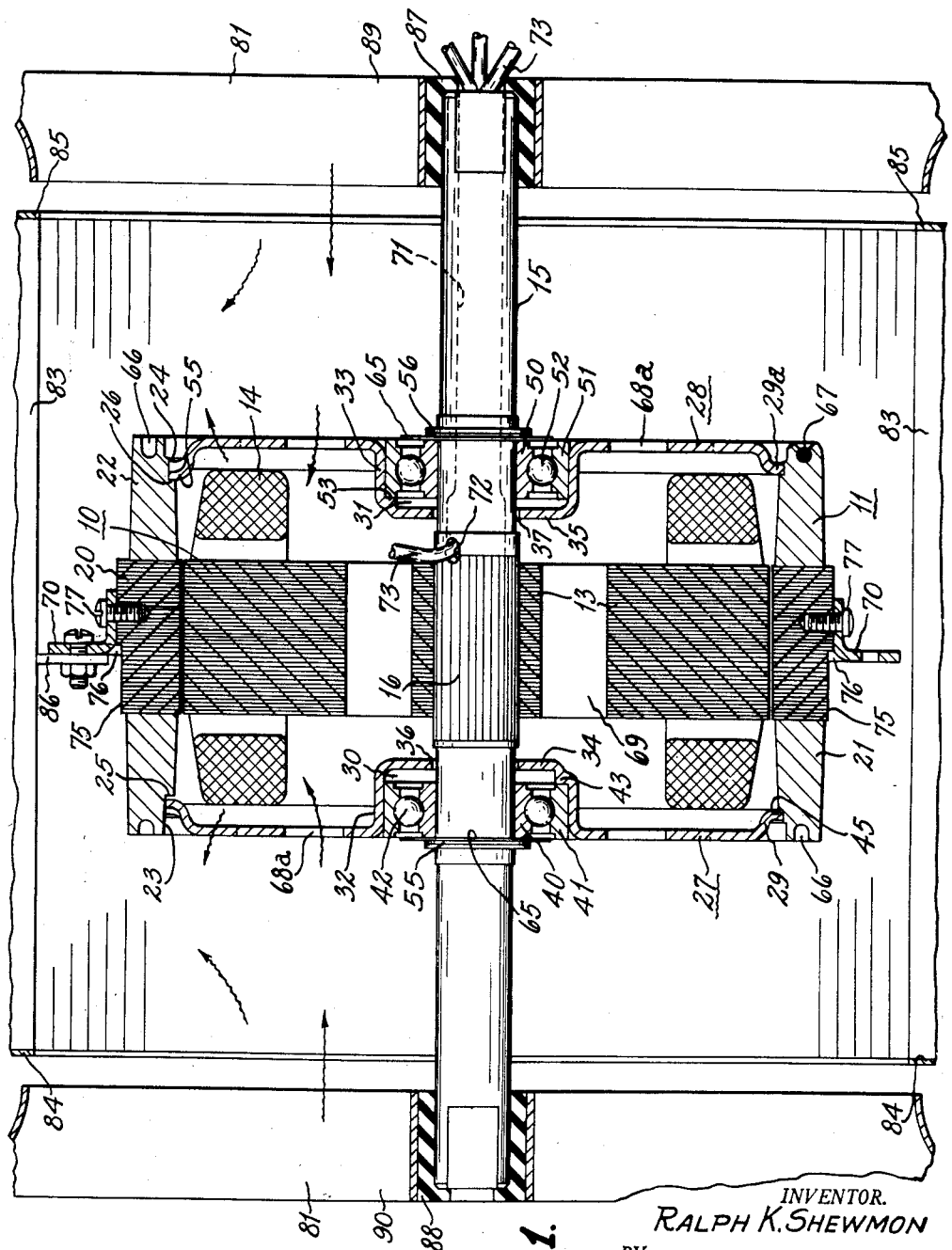
Figure 1 is a transverse cross section of a dynamoelectric machine incorporating features of this invention.

In this invention the dynamo-electric machine, or electric motor, shown in Figure 1 comprises a stator member 10 and a rotor member 11. The stator 10 consists of a laminated core 13 that has field windings 14 of conventional type. The stator core 13 is fixedly secured on a shaft 15, the shaft 15 having a longitudinally splined portion 16 on which the stator core 13 is pressed whereby the stator 10 on the shaft 15 forms an integral unit. The rotor 11 consists of a laminated core 20 having a plurality of slots in which there are cast conventional rotor bars that are interconnected with integrally cast end rings 21 and 22, forming thereby a squirrel cage type of rotor.

The end rings 21 and 22 have annular recesses 23 and 24 that form annular shoulders 25 and 26 respectively.

The rotor 11 is carried by a pair of support disks 27 and 28, one of which disks 28 is shown in Figure 2. The disks 27 and 28 each have peripheral portions 29 shown in Fig. 2, that engage the corresponding shoulders 26 and 25 in the end rings of the rotor 11.

The central portion of each of the support disks 27 and 28 is formed as a recess 30 and 31 respectively having axially extending walls 32 and 33 and radially extending walls 34 and 35. Axial openings 36 and 37 in the walls 34 and 35 are provided for passage of the shaft 15.

An anti-friction bearing consisting of an inner race 40 and an outer race 41 separated by anti-friction bearings 42 is pressed into the recess 30 as a press fit within the inner periphery of the wall 32, stop members 43 positioned around the periphery of the recess 30 limiting the movement of the bearing into the recess 30 and providing for a predetermined positioning of the bearing assembly in the recess 30, which also establishes a predetermined position between the bearing assembly and the inner edges 45 of the peripheral portions 29 of the disk 27, the reason for which will be hereinafter more clearly pointed out. A bearing means consisting of an inner race 50 and an outer race 51 separated by anti-friction bearing elements 52 is placed within the recess 31 in a press fit condition with the inner periphery of the wall 33, a plurality of stops 53 limiting the movement of the bearing assembly into the recess 31 and thereby establishing a predetermined position of the bearing assembly relative to the inner edge portions 55 of the peripheral portions 29a of the mounting disk 28.

From the description thus far, it will be apparent that the stator member 10 is fixedly supported on the shaft 15 and that the rotor member 11 is also supported on the shaft 15 through the bearing assemblies and the support disks 27 and 28, the bearing assemblies providing for relative rotation between the stator member 10 and the rotor member 11. Also, it will be apparent that the shaft 15 can be stationarily mounted to provide for rotation of the rotor 11 about the stator 10, or if desired, the rotor member 11 could be mounted stationarily and the stator member 10 allowed to rotate. It will also be apparent that in either event the field coils 14 and the stator 10 could be either in the stationary element as shown in Figure 1 or if the stationary element is to be the outer member the field coils could be placed in the outer member and the rotor be placed internally of the stator containing the field coils.

In the electric motor illustrated in Figure 1 the shaft 15 and the stator 10 are adapted for stationary mounting with the rotor 11 rotating about the stator 10.

The inner race 40 of the bearing assembly 40—41—42 is carried upon the shaft 15 and is positioned in a fixed spatial position relative to the stator 10 by means of a stop member 55 that is in the form of a snap ring placed in a peripheral slot in the shaft 15 to retain the bearing assembly 40—41—42 on the shaft 15. Similarly, the bearing assembly 50—51—52 is held in position on the shaft 15 by means of a stop member 56 that is also in the form of a snap ring located in a peripheral slot in the shaft 15. The stop member 56 positions the bearing assembly 50—51—52 in a predetermined relationship relative to the stator 10 and also provides a determined spatial separation of the bearing assemblies, their maximum degree of separation being controlled by the stop members 55 and 56.

The disk-like support plates 27 and 28 are of a resilient character, and since they are of a disk shape will act as diaphragms when pressure is applied to the outer peripheral portions 29.

The support disks 27 and 28 are shaped such that the inner edges 45 and 55 of the peripheral portions 29 would have a spatial separation that is less than the spatial separation of the shoulders 25 and 26 of the rotor 11 when the bearing assemblies are in the respective positions shown in Fig. 1 and the disks 27 and 28 would be in an unflexed or relaxed condition, the rotor 11 being removed from its location between the peripheral portions 29 and 29a of the disks 27 and 28. However, when the disks 27 and 28 are in assembled condition with the rotor 11 positioned between the disks, as shown in Figure 1, the disks are in a state of flexure in which each of the disks has been flexed in an axial direction with the result that the spring action of the disks 27 and 28 is opposed with the result that the peripheral portions 29 of the disks engage the shoulders 25 and 26 in the rotor 11 with spring pressure. Concurrently, since the disks 27 and 28 are in a state of flexure, the disks being carried on the outer races 41 and 51 respectively of the bearing assemblies with the inner races 40 and 50 respectively engaging the stops 55 and 56, an axial thrust is applied to the bearing assemblies which preloads or pressure loads the bearing assemblies.

From the foregoing description it will thus be seen that the assembly of the electric motor heretofore described and the alignment of the rotor and stator members is maintained by the spring action of the support disks 27 and 28.

The degree of spring action of the disks 27 and 28 can be regulated by placing one or more washers 65 between one of the stops 56 and the adjacent bearing assembly 50—51—52, the greater the number of washers placed in this location providing for an increase of spring action of the support disks 27 and 28. Also in place of washers 65, a flat Belleville type spring can be used between the stop 56 and the adjacent bearing assembly to provide for an increase of spring action between the support disks 27 and 28 and the rotor 11 and increase the pressure preload on the bearing assemblies.

Each of the end rings 21 and 22 is provided with a plurality of recesses 66 spaced equidistantly about the periphery of the end rings to receive balancing weights 67, the edges of the recesses 66 being staked inwardly when the balancing weight 67 is placed in the recess, as shown in Fig. 1.

The disks 27 and 28 are provided with cut out portions 68 between the peripheral portions 29 to provide openings for air circulation. Additional openings 68a are provided radially adjacent the recesses 31 and 32 that also provide for air circulation into the interior of the stator, the general direction of air flow being inwardly through the openings 68a and outwardly through the openings 68 as illustrated by the arrows on Figs. 1 and 2. The stator is provided with openings 69 for air circulation.

The shaft 15 is provided with an axial passage 71 that communicates with radial passages 72 through which electric conductor leads 73 are passed to the exterior of the electric motor assembly, the shaft 15 in this instance being a stationary member.

One or more mounting ring segments 70 are secured to the outer periphery of the rotor 11 midway between opposite sides of the rotor. The rotor has a peripheral shoulder 75 that is engaged by a tang 76 on the mounting segment 70 whereby to position the member 70 on the rotor. One or more cap screws 77 secure the mounting ring segments to the outer periphery of the rotor.

The electric motor heretofore described is particularly suitable as a direct drive motor for the rotor of a blower of the type illustrated in Fig. 6. The blower or forced air circulation fan of Fig. 6 comprises a fan housing 80 that is in the form of a volute and is provided with air inlet openings 81 on both sides of the housing and an air discharge opening 82. A blower wheel of the squirrel cage type is positioned within the housing, the blades of the blower wheel being secured to the mounting ring segments 70 as more particularly shown in Fig. 1. The fan blades 83 consist of narrow radially positioned blade elements that extend between annular rings 84 and 85 and secured thereto whereby to provide a fan rotor of the squirrel cage type. The blades 83 are also secured to an annular ring 86 positioned midway between opposite sides of the fan rotor whereby to secure the rotor on the mounting segments 70. The fan rotor is thereby secured to the rotor 22 of the dynamo-electric machine for rotation with the rotor.

The electric motor comprising the stator 10 and rotor 11 is mounted within the housing 80 but having the stationary shaft 15 secured within rubber bushings 87 and 88 located in spider members 89 and 90 that are positioned within the inlet openings 81 of the housing. The shaft 15 is non-rotatable in the rubber bushings 87 so that it is stationary and holds the stator 10 stationary while the rotor rotates around the stator to carry the squirrel cage fan rotor.

Air drawn into the housing 80, as shown by the arrows on Fig. 1 has its course of direction change, from axial of the shaft 15 to radial by action of the blades 83 of the fan rotor. Some of the air passes through the openings 68a to the interior of the electric motor and passes outwardly through the openings 68 thereby removing heat from the windings of the stator 10. The openings 69 in the stator 10 also provide for air circulation in either direction through the stator for removing heat from the stator core.

In Figure 3 there is illustrated a modified arrangement of the electric motor wherein a stationary shaft 100 supports a stator 105 having field windings 106. The rotor 110 of the motor has end rings 111 and 112 each of which is provided with an annular shouldered recess 113 and 114.

The shaft 100 has shoulders 116 and 117. An anti-friction bearing element consisting of the inner race 120, outer race 121 and anti-friction elements 122 is placed on a reduced diameter portion 123 of the shaft 100, the inner race 120 engaging the shoulder 116 and retained against the shoulder by the nut 124. Similarly, an anti-friction bearing member consisting of the inner race 130, outer race 131 and anti-friction bearing elements 132 is carried on the reduced diameter portion 133 of the shaft 100, the inner race 130 being held against the shoulder 117 by means of the nut 134.

The bearing assembly 120, 121, 122 is positioned within a central recess 140 in a support plate disk 141, a radial wall 142 positioning the support disk 141 relative to the bearing assembly retained therein. Similarly, the bearing assembly 130, 131, 132 is carried in a central recess 145 in a disk support plate 146, the recess 145 having a radial wall 147 that positions the disk 146 relative to the bearing assembly contained therein.

The outer peripheral edge 150 of the disk 141 and the peripheral edge 151 of the disk 146 is positioned in the shouldered recesses 113 and 114 respectively to support the rotor 110 on the shaft 100 and in operating relation to the stator 105.

As heretofore described, the shoulders 116 and 117 on the shaft 100 dispose the bearing assemblies thereadjacent in a predetermined spatial relationship. The support disks 141 and 146 are resilient and are shaped such that the outer peripheral edges 150 and 151 have a spatial separation, when the disks are in an unflexed or relaxed condition, that is less than the spatial separation of the shouldered recesses 113 and 114, whereby when the support disks 141 and 146 are in assembled condition as shown in Fig. 3 with the rotor 110 between the disks 141 and 146, the disks are sprung outwardly to effect a spring action for retention of the outer peripheries of the disk in the shouldered recesses 113 and 114 and concurrently effect a pressure loading on the bearing assemblies that support the disks.

In Figures 4 and 5 there is illustrated a modified arrangement by which the electric conductor leads for the stator are carried to the exterior of the electric motor. In this arrangement the shaft 15 is provided with a series of longitudinally extending slots 175 in the surface of the shaft in which the conductor leads 73a are received. Snap rings 176 prevent engagement of the conductor leads 73a with any of the rotating elements of the motor.

While the form of embodiment of the invention as herein disclosed constitutes a preferred form, it is to be understood that other forms might be adopted as may come within the scope of the claims which follow.

What is claimed is as follows:

1. In a dynamoelectric machine, the combination of, cooperating stationary and rotating members forming stator and rotor members of a dynamoelectric machine, a shaft having one of said members fixedly secured thereon, bearing means on said shaft at each of opposite sides of said one member, said bearing means being carried on said shaft in a predetermined spatial relation relative to each other and to said one member, the other of said members being disposed around the said one member and having abutment means at each of opposite sides of the said one member in predetermined fixed spatial relation and adapted for engagement by peripheral portions of support plate means, means including a member axially movable on said shaft and adapted to position each of said bearing means relative to said shaft, and support plate means carried on said bearing means at each of opposite sides of said one member with each of the said plate means having a plurality of radially disposed axially deflectable peripheral portions, said peripheral portions of said plate means being engageable with said abutment means and having axial spatial separation in normal non-deflected position that is less than the axial spatial separation of the abutment means whereby when said plate means is assembled between the said members with the said peripheral portions engaging said abutment means the peripheral portions of the plate means are deflected axially outwardly to effect spring force engagement of the peripheral portions of the plate means with the said abutment means and effect thereby retention of assembly of the said members, said plate means each having the portions thereof peripherally between the said radially disposed portions positioned radially inwardly of the engagement of the said radially disposed portions with the abutments to provide openings between the said plate means and the said other member, and additional openings in said plate means adjacent said bearing means, the said openings providing for ingress and egress of air into and out of interior of said dynamoelectric machine.

2. A dynamoelectric machine assembly for use in support and cooling thereof, comprising, a stationary shaft, a stator member having field windings and supported by said shaft, a rotor member located radially outwardly of said stator member having said field windings and having annular shoulder-forming means at each side thereof, stop means on said shaft at locations on opposite sides of said stator member and spaced axially therefrom, bearing means on said shaft at locations adjacent to said stop means and intermediate said stop means and said stator member, a pair of support discs provided intermediate said bearing means and said rotor member, a central portion of each of said discs having radially extending walls forming a recess and axially extending walls engaging said bearing means, a plurality of peripherally extending portions integral with each support disc and adapted to engage one annular shoulder-forming means of said rotor member, said plurality of peripherally extending portions being located intermediate cut out portions forming radially outer openings for air circulation and enhancing spring pressure under which each disc is engaged between said bearing means and one annular shoulder-forming means of said rotor member, each of said discs having additional openings located radially inwardly both relative to said stator member having field windings and relative to said cut out portions forming radially outer openings such that cooling air for said field windings can circulate from radially inner to said radially outer openings, and regulating means on said shaft adapted to engage said bearing means axially to provide a control for degree of spring pressure under which said discs axially preload said bearing means and under which said peripherally extending portions engage said shoulder-forming means at locations intermediate the cutout portions.

3. The assembly of claim 2 wherein said regulating means is a flat Belleville type spring provided between said stop means on said shaft and said bearing means so as to provide for an increase of spring action between said support discs and said rotor member relative to said bearing means.

References Cited in the file of this patent

UNITED STATES PATENTS

| | | |
|---|---|---|
| 1,270,527 | Kingsbury | June 25, 1918 |
| 2,482,847 | Godman | Sept. 27, 1949 |
| 2,538,196 | Hildebrand et al. | Jan. 16, 1951 |
| 2,697,179 | Wendel | Dec. 14, 1954 |
| 2,711,285 | Burrowes | June 21, 1955 |
| 2,742,223 | Font | Apr. 17, 1956 |
| 2,776,088 | Wentling | Jan. 1, 1957 |
| 2,802,957 | Gievers | Aug. 13, 1957 |

FOREIGN PATENTS

| | | |
|---|---|---|
| 648,665 | Great Britain | Jan. 10, 1951 |
| 866,814 | Germany | Feb. 12, 1953 |